US009213771B2

(12) United States Patent
Chen et al.

(10) Patent No.: US 9,213,771 B2
(45) Date of Patent: Dec. 15, 2015

(54) QUESTION ANSWERING FRAMEWORK

(71) Applicant: SAP AG, Walldorf (DE)

(72) Inventors: Yingyu Chen, Shanghai (CN); Bin Dong, Shanghai (CN); Yongyuan Shen, Shanghai (CN); Zhenglong Wei, Shanghai (CN); Xiaowei Liu, Shanghai (CN)

(73) Assignee: SAP SE, Walldorf (DE)

( * ) Notice: Subject to any disclaimer, the term of this patent is extended or adjusted under 35 U.S.C. 154(b) by 226 days.

(21) Appl. No.: 13/911,088

(22) Filed: Jun. 6, 2013

(65) Prior Publication Data

US 2014/0358890 A1 Dec. 4, 2014

(30) Foreign Application Priority Data

Jun. 4, 2013 (CN) .......................... 2013 1 0218383

(51) Int. Cl.
*G06F 17/30* (2006.01)

(52) U.S. Cl.
CPC ................................ *G06F 17/30867* (2013.01)

(58) Field of Classification Search
CPC ..................... G06F 17/30864; G06F 17/30867
USPC .......................................................... 707/710
See application file for complete search history.

(56) References Cited

U.S. PATENT DOCUMENTS 7,376,634 B2 5/2008 Liu et al.
7,684,621 B2 3/2010 Tunney
7,685,127 B2 3/2010 Gauweiler
8,015,006 B2 9/2011 Kennewick et al.
8,027,973 B2 * 9/2011 Cao et al. ...................... 707/728
8,301,438 B2 10/2012 Ferrucci et al.
8,370,166 B2 2/2013 Ronnewinkel
8,396,893 B2 3/2013 Gaffga et al.
2004/0117352 A1 6/2004 Schabes et al.
2006/0106788 A1 * 5/2006 Forrest .............................. 707/4
2006/0248049 A1 * 11/2006 Cao et al. .......................... 707/3
2007/0038609 A1 * 2/2007 Wu .................. G06F 17/30675 1/1
2008/0005075 A1 * 1/2008 Horvitz et al. .................... 707/3
2008/0294637 A1 11/2008 Liu
2010/0036827 A1 * 2/2010 Jain .................................. 707/5
2010/0081120 A1 4/2010 Nanjiani et al.
2010/0235164 A1 9/2010 Todhunter et al.
2010/0235311 A1 * 9/2010 Cao et al. ........................ 706/46
2011/0258230 A1 * 10/2011 Jung et al. ..................... 707/780
2012/0078902 A1 3/2012 Duboue et al.
2012/0259885 A1 * 10/2012 Palla ................ G06F 17/30734 707/769
2013/0080461 A1 * 3/2013 Byrne ............... G06F 17/30958 707/769
2013/0262501 A1 * 10/2013 Kuchmann-Beauger ............ G06F 17/30451 707/769
2014/0149446 A1 * 5/2014 Kuchmann-Beauger et al. ............................ 707/763
2014/0172757 A1 * 6/2014 Liu .................. G06F 17/30941 706/12

(Continued)

OTHER PUBLICATIONS

Katz et al., Answering multiple questions on a topic from heterogeneous resources, Nov. 2004, 10 pages.*

(Continued)

*Primary Examiner* — Noosha Arjomandi
(74) *Attorney, Agent, or Firm* — Horizon IP PTE Ltd

(57) ABSTRACT

Described herein is a technology to facilitate automated question answering. In one implementation, an input question is first received. Different search strategies may be used to search multiple types of data from multiple types of knowledge databases to generate one or more candidate answers to the input question. The one or more candidate answers are evaluated to generate a final answer to the input question.

16 Claims, 9 Drawing Sheets

100

(56) References Cited

U.S. PATENT DOCUMENTS

| | | | | |
|---|---|---|---|---|
| 2014/0222416 | A1* | 8/2014 | Huang | 704/9 |
| 2014/0258286 | A1* | 9/2014 | Brown et al. | 707/728 |

OTHER PUBLICATIONS

SAP AG; Question & Answer Database; Apr. 2001; SAP AG; Walldorf; Germany; (http://help.sap.com/printdocu/core/print46c/en/data/pdf/SVASQADBS/Q&ADBSTRUCSTAN.pdf).

Sneiders; Automated question answering: template-based approach; KTH, Feb. 7, 2002; 279; Data- och systemvetenskap; Kista; Sweden; (http://kth.diva-portal.org/smash/record.jsf?pid=diva2:9086).

Itko et al.; Dynamic test generation over ontology-based knowledge representation in authoring shell; May 4, 2009; 8185-8196; 36; Pergamon Press, Inc.; NY; USA; (http://dl.acm.org/citation.cfm?id=1508531).

* cited by examiner

| Question Class | Sub-class | Answer Type |
|---|---|---|
| WHAT | BASIC_WHAT | MONEY/NUMBER/DEFINITION/TITLE |
| | WHAT_WHO | PERSON/ORGANIZATION |
| | WHAT_WHEN | DATE/TIME/AGE |
| | WHAT_WHERE | LOCATION |
| | | |
| WHO | | PERSON/ORGANIZATION |
| | | |
| HOW | BASIC_HOW | MANNER |
| | HOW_MANY | NUMBER |
| | HOW_LONG | TIME/DISTANCE |
| | HOW_MUCH | MONEY/PRICE |
| | HOW_MUCH_MODIFIER | |
| | HOW_FAR | DISTANCE |
| | HOW_TALL | NUMBER |
| | HOW_RICH | |
| | HOW_LARGE | NUMBER |
| | | |
| WHERE | | LOCATION |
| | | |
| WHEN | | DATE/TIME |
| | | |
| WHICH | WHICH_WHO | PERSON/ORGANIZATION |
| | WHICH_WHERE | LOCATION |
| | WHICH_WHEN | DATE/TIME/AGE |
| | WHICH_WHAT | MONKY/NUMBER/DEFINITION/TITLE |
| | | |
| NAME | NAME_WHO | PERSON/ORGANIZATION |
| | NAME_WHERE | LOCATION |
| | NAME_WHAT | MONKY/NUMBER/DEFINITION/TITLE |
| | | |
| WHY | | REASON |
| | | |
| WHOM | | PERSON/ORGANIZATION |

| | ID | TITLE | CONTENT |
|---|---|---|---|
| 1 | 292897 | What is the value of a Remington with patent date July 1902? | The model 12 was manufactured from 1909 to 1936.The value of a model 12 is greatly dete... |
| 2 | 289889 | What are some of the jobs in Ireland? | AnswerAs an Irish man myself I'm happy to answer..im from galway WEST IRELAND there'... |

| TITLE | CONTENT | LANG | URL |
|---|---|---|---|
| Why is the ocean blue? | Believe it or not, no one is really sure why the ocean is blue! As you may, kno... | EN | http://www.faqkids.com/414-ocean-blue.html |
| Why is the Atlantic ocean blue? | it was green up untill the fish peed in it. (green + yellow = blue) | EN | http://wiki.answers.com/Q/Why_is_the_Atlanti |
| Water is clear so why is the o... | it reflects the color of the sky(like how the ocean is gray during a storm) | EN | http://wiki.answers.com/Q/Water_is_clear_so_ |
| Why is that reflected color of ... | The reason the ocean is blue is because the color of the sky reflects on the ... | EN | http://wiki.answers.com/Q/Why_is_that_reflect |
| Why the water is blue? | The Water Reflects Off The Sky.Actually, because visible light is composed ... | EN | http://wiki.answers.com/Q/Why_the_water_is_ |

| String | N-Grams | | | | | | | | Matching N-Grams |
|---|---|---|---|---|---|---|---|---|---|
| hans | _h | h | ha | a | an | n | ns | s | |
| gans | _g | g | ga | a | an | n | ns | s | 63 % |
| haas | _h | h | ha | a | aa | a | as | s | 63 % |

| Question | Question Template | Answer | Answer Template |
| --- | --- | --- | --- |
| Who is the CEO of Apple? | Who be <role> of <entity> | Tim Cook | <person> |
| Who was Lincoln's Secretary of State? | who be <entity>'s <role> | William H. Seward | <person> |

| SUBJECT | PREDICATE | OBJECT |
| --- | --- | --- |
| <The_Sunless_Citadel> | rdf:type | <wordnet_faculty_105650329> |
| <Jafar_Kashani> | rdf:type | <wordnet_player_110439851> |
| <Mexico> | <hasCapital> | <Mexico_City> |
| <India> | <hasCapital> | <New_Delhi> |

*Fig. 9*

QUESTION ANSWERING FRAMEWORK

TECHNICAL FIELD

The present disclosure relates generally to information retrieval, and more specifically, to a question answering framework.

BACKGROUND

The rapid development of science and technology has led to a rapidly increasing amount of published information. Question answering (QA) systems have been designed to access and search through such information to automatically answer questions posed by humans in a natural language.

One of the major challenges in such QA systems is to provide relevant answers amid multifarious search results. Search engines often return a large set of search results that are irrelevant to the question, causing the user to be confused and lost in the myriad of results. Even the top ranked search result may not be related to the question itself. This is especially prevalent in cases where the question is short and includes common words with spellings that are very similar to names or content of other different topics, such as the name of a film or lyrics of a popular song.

There are two common causes of retrieving irrelevant answers. Firstly, irrelevancy may be caused by low accuracy in question parsing and text analysis. In other words, the QA system may not correctly interpret the meaning of the input question. Irrelevancy in answers may also be caused by low accuracy in the answer finding capability of the QA system.

In addition, answers tend to be limited in domain-specific QA systems. Most QA systems support only a certain kind of domain, and do not support access to a wide collection of knowledge bases. Frequently, no answer is provided for questions with answers from an unsupported domain. Even if answers can be found, they may not be comprehensible by the user. In most cases, the answers may be very long with many definitions, principle introductions, references, related topics, etc. that make it difficult for the user, particularly a school-age child, to quickly understand.

Even further, the performance of conventional QA systems is typically unsatisfactory. In order to correctly interpret human language and extract answers from large knowledge bases, QA systems often employ a wide data search and deep data mining that are computationally expensive and often result in slow retrieval time and low accuracy.

Therefore, there is a need for an improved framework that addresses the above-mentioned challenges.

SUMMARY

A computer-implemented technology for facilitating question-answering is described herein. In accordance with one aspect of the technology, an input question is first received. Different search strategies are used to search multiple types of data from multiple types of knowledge databases to generate one or more candidate answers to the input question. The one or more candidate answers are evaluated to generate a final answer to the input question.

In accordance with another aspect, an input question is first received. The technology then determines one or more types of knowledge databases available for searching. If a question-answer paired knowledge database is available, question-answer paired data from the question-answer paired knowledge database is searched to determine a first candidate answer to the input question. If a plain text knowledge database is available, plain text data from the plain text knowledge database is searched to determine a second candidate answer to the input question. If a resource description framework (RDF) knowledge database is available, RDF data from the RDF knowledge database is searched to determine a third candidate answer to the input question. The first, second or third candidate answer may then be evaluated to generate a final answer to the input question.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 4 shows an exemplary table that maps classes and sub-classes to corresponding answer types;

FIG. 5*a* shows an exemplary table containing question-answer paired data;

FIG. 5*b* shows an exemplary table containing full text search results;

FIG. 6 shows an exemplary n-gram model;

FIG. 8 shows an exemplary look-up table containing question and answer templates for the "who" question; and FIG. 9 shows exemplary resource description framework data.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A technology for facilitating question-answering is described herein. One aspect of the technology provides a question-answering (QA) framework that supports multiple types of knowledge databases. A knowledge database generally refers to an information repository where information may be collected, organized, shared, searched and/or used. Different types of knowledge databases include, for example, formulated question-answer paired knowledge databases, plain text knowledge databases and resource description framework (RDF) knowledge databases, which will be described in more detail in the following description.

One aspect of the present technology implements a different search strategy for each type of knowledge database. Different search strategies may be combined to support a query in multiple types of knowledge databases and provide the most relevant answer in response to the query. This allows the user to combine knowledge databases without having to consolidate data from the different types of knowledge databases. With such expanded knowledge database support, the user can build a comprehensive knowledge system that increases the rate of answer finding, particularly for specific domain areas.

Another aspect of the present technology provides an improved methodology for question pairing and answer assembling with enhanced accuracy in question identification and answer extractions. With in-memory technology, parallel computing and in-built text analysis functionality, more data may be processed with high accuracy and speed that are acceptable to the user. It is only with such powerful computing ability that multiple data sources and unlimited domains are feasible. These and other advantages and aspects will be described in more detail in the following description.

The framework described herein may be implemented as a method, a computer-controlled apparatus, a computer process, a computing system, or as an article of manufacture such as a computer-usable medium. These and various other features will be apparent from the following description.

Figure 1:
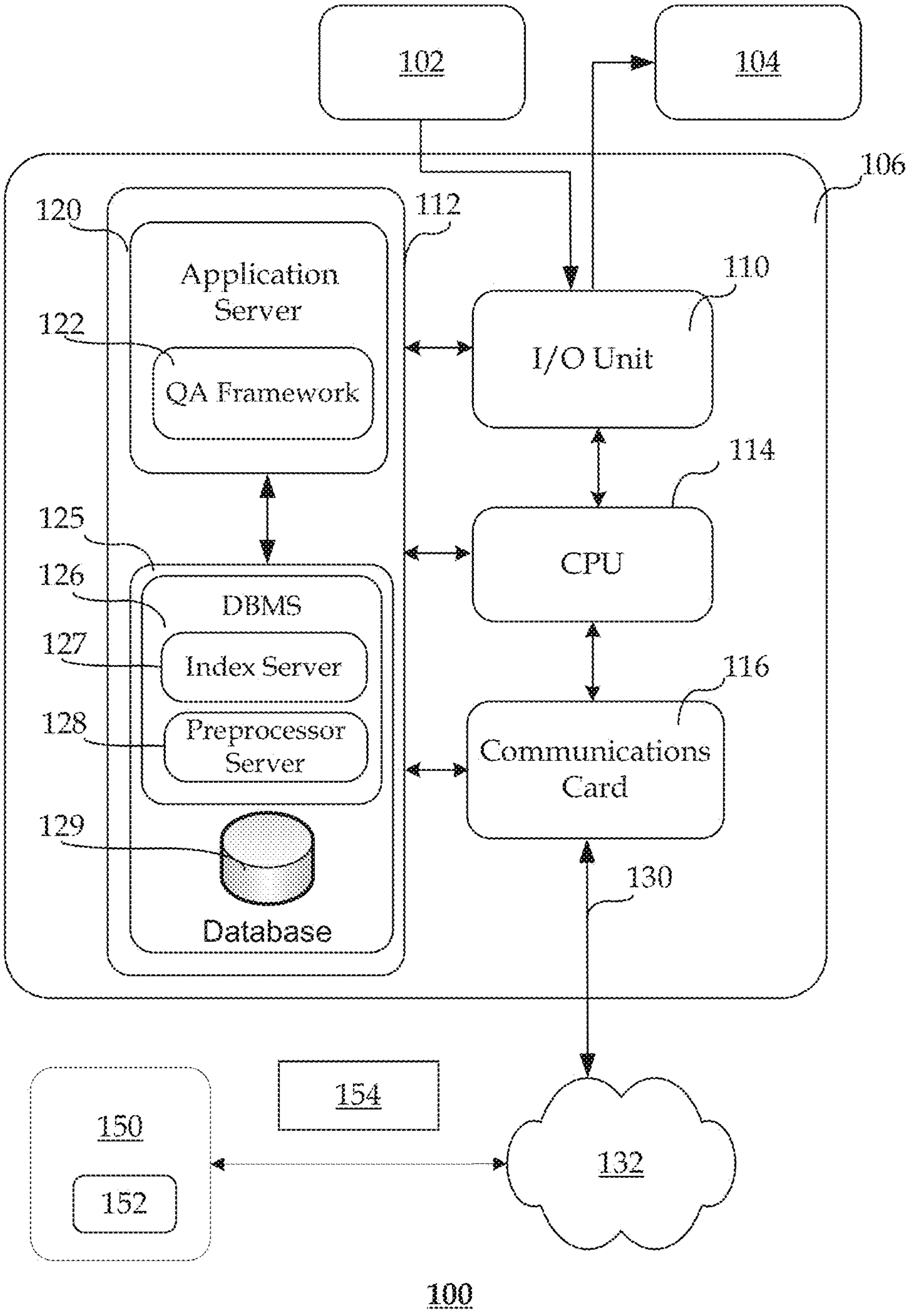
FIG. 1 is a block diagram illustrating an exemplary system.

FIG. 1 shows a block diagram illustrating an exemplary system 100 that may be used to implement the framework described herein. System 100 may include a computer system 106 communicatively coupled to an input device 102 (e.g., keyboard, touchpad, microphone, camera, etc.) and an output device 104 (e.g., display device, monitor, printer, speaker, etc.). Computer system 106 also may include a communications card or device 116 (e.g., a modem and/or a network adapter) for exchanging data with network 132 using a communications link 130 (e.g., a telephone line, a wireless network link, a wired network link, or a cable network). Network 132 may be a local area network (LAN) or a wide area network (WAN). The computer system 106 may be communicatively coupled to one or more other computer systems 154 via network 132. For example, the computer system 106 may act as a server and operate in a networked environment using logical connections to one or more client computers 150. Client computers 150 may include components similar to the computer system 106, and may be in the form of a desktop computer, mobile device, tablet computer, communication device, browser-based device, etc.

Computer system 106 includes a central processing unit (CPU) 114, an input/output (I/O) unit 110, and a memory module 112. Other support circuits, such as a cache, a power supply, clock circuits and a communications bus, may also be included in computer system 106. In addition, any of the foregoing may be supplemented by, or incorporated in, application-specific integrated circuits. Examples of computer system 106 include a handheld device, a mobile device, a personal digital assistance (PDA), a workstation, a server, a portable laptop computer, another portable device, a minicomputer, a mainframe computer, a storage system, a dedicated digital appliance, a device, a component, other equipment, or some combination of these capable of responding to and executing instructions in a defined manner.

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof.

Memory module 112 serves to store machine-executable instructions, data, and various software components for implementing the techniques described herein, all of which may be processed by CPU 114. As such, the computer system 106 is a general-purpose computer system that becomes a specific-purpose computer system when executing the machine-executable instructions. Alternatively, the various techniques described herein may be implemented as part of a software product, which is executed via an application server 120 and/or a data server 125. Each computer program may be implemented in a high-level procedural or object-oriented programming language (e.g., C, C++, Java, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In one implementation, the memory module 112 of the computer system 106 includes an application server (or stack) 120 and a data server (or stack) 125. Application server (or stack) 120 may store a QA framework 122 that may be coded using a high-level programming language, such as Java, C++, ABAP™, etc. Other types of programming languages are also useful. QA framework 122 may include a set of function modules or programs of a QA framework designed to perform various data collection and/or QA processing functions, such as question parsing, answer retrieval and ranking, answer assembly and so forth. More details of these and other exemplary functions will be provided in the following description.

Data server (or stack) 125 may include a database management system (DBMS) 126 and a database 129. DBMS 126 may be coded using a database query language, such as SQL or extensions thereof. Other types of programming languages are also useful. DBMS 126 may include a set of programs, functions or procedures (e.g., HANA custom procedures) for defining, administering and processing the database 129. More particularly, DBMS 126 may include an index server 127 and a preprocessor server 128. Index server 127 provides database functionality for storage and retrieval of query data (e.g. indexes) that is associated with information stored in the database 129, while preprocessor server 128 may serve to analyze documents to be indexed by the index server 127. More details of these and other exemplary functions will be provided in the following description.

A user at the client computer 150 may interact with a user interface 152 to communicate with the database 129 via the application server 120 and the DBMS 126. In one implementation, database 129 is an in-memory database that relies primarily on the system's main memory for efficient computer data storage. More particularly, the data in the in-memory database may reside in volatile memory and not persistently stored on a hard drive, thereby allowing the data to be instantly accessed and scanned at a speed of several megabytes per millisecond. The in-memory database 129 allows seamless access to and propagation of high volumes of data in real-time. Parallel processing may further be achieved by using a multicore processor 114 in conjunction with the in-memory database 129. In-memory database technology includes systems such as SAP's HANA (high performance analytic appliance) in-memory computing engine.

Column-based data storage may further be implemented in the in-memory database 129, where data tables are stored as columns of data, in sequence and in compressed memory blocks. This may facilitate faster aggregation of data when calculations are performed on single columns. Alternatively, row-based data storage is also possible. In some implementations, instead of updating entire rows, only fields that have changed will be updated. This avoids having to lock entire data tables during updates to prevent conflicting modifications to a set of data. High levels of parallelization may be achieved, which is critical to real-time processing of live data streams and performing constant and substantially simultaneous updates.

It should be appreciated that the different components and sub-components of the computer system 106 may be located on different machines or systems. For example, application server 120 and data server 125 may be implemented on different physical machines or computer systems. It should further be appreciated that the different components of the client computer 150 may also be located on the computer system 106, or vice versa.

Figure 2:
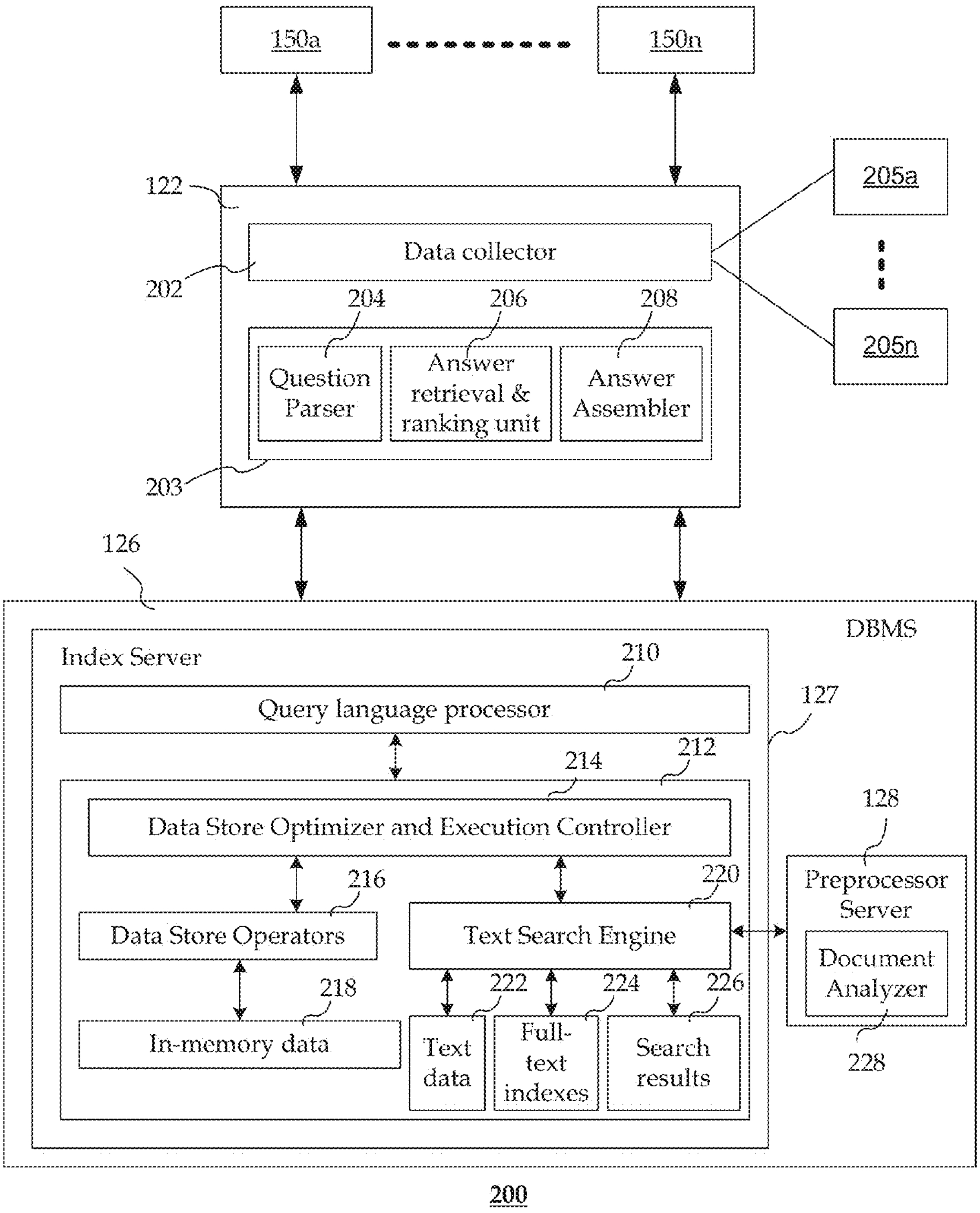
FIG. 2 is a block diagram illustrating an exemplary architecture.

FIG. 2 shows an exemplary architecture 200 of the system 100. It should be noted that in the following discussion, reference will be made, using like numerals, to the features described in FIG. 1. In some implementations, the QA framework and DBMS (122, 126) may include less or many more components than those shown in FIG. 2.

As shown, client devices (150*a* to 150*n*) communicate with the QA framework 122 to provide one or more input questions and to receive responses to the input questions from the QA framework 122. The input question may be expressed in natural language, and provided in the form of a statement or an answer seeking an appropriate question. The client devices (150*a* to 150*n*) and the QA framework 122 may communicate with each other over a network using a web service. The web service may implement various web technologies, including a representational state transfer (REST) based interface, remote procedure call (RPC) based technologies, simple object access protocol (SOAP) based technologies, service-oriented architecture (SOA) based technologies, and so forth.

In response to the question provided by one or more client devices 150*a-n*, the QA framework 122 may automatically generate one or more answers. In some implementations, the QA framework 122 includes a data collector 202 and a QA processor 203. The data collector 202 may serve to retrieve information from one or more different knowledge databases (205*a* to 205*n*) for generating the answers. In one implementation, the data collector 202 retrieves data by automatically downloading a collection of data from the knowledge databases (205*a* to 205*n*), parsing and converting the data into a native format suitable for storage in the database 129. The downloading may be performed on-demand or periodically at predetermined time intervals. Additionally, or alternatively, the data collector 202 may include a crawler, spider, robot, or other similar application that is configured to automatically discover and retrieve relevant information directly from the one or more knowledge databases (205*a* to 205*n*). Even further, the data collector 202 may retrieve previously stored information directly from the database 129.

Knowledge databases (KBs) (205*a* to 205*n*) may provide information in different formats. The knowledge databases may be structured, semi-structured or unstructured. A first exemplary type of knowledge database provides a structured collection of formulated or prepared question-answer pairs. Such question-answer paired knowledge databases include, but are not limited to, Yahoo! Answers, WikiAnswer and Baidu Zhidao.

A second exemplary type of knowledge database provides a semi-structured or unstructured collection of natural language documents containing plain text paragraphs. Such plain text knowledge databases may include, but are not limited to, public or private databases or knowledge bases, Intranets, the Internet, web-pages (e.g., news website, domain-based website, Wikipedia, etc.), which can be searched and/or crawled for content. In some implementations, the data collector 202 retrieves the plain text from the plain text knowledge databases and preprocesses the plain text before storing it in the database 129. The plain text may be preprocessed by categorizing it using, for example, a training model.

A third exemplary type of knowledge database stores fact-based information in the Resource Description Framework (RDF) format. RDF is a standard data model for data interchange on the Web. It is published by the World Wide Web Consortium (W3C), and is generally used to conceptually describe or model information that is implemented in web resources. A collection of RDF statements intrinsically represent a labeled, directed multi-graph. As such, an RDF-based data model is naturally suited for certain types of knowledge representation. In practice, RDF data often persist in relational databases or native representations (also known as Triple stores).

RDF knowledge databases include, for instance, YAGO and DBPedia. YAGO extracts data from Wikipedia, WordNet and GeoNames. More particularly, YAGO is built on Wikipedia's info boxes and category pages. Info boxes are standardized tables that contain basic information about the entity described in the article. For instance, there are info boxes for countries, which contain the native name of the country, its capital and its size. Info boxes may be much easier to parse and exploit, relative to natural language text. RDF may also express entities, facts, relations between facts and properties of relations. Facts in YAGO are represented in RDF triple store format, and may be queried using SQL and/or SPARQL language.

QA processor 203 serves to automatically process the input question received by the QA framework 122 and generate one or more answers in response to the question. In one implementation, QA processor 203 further includes a question parser 204, an answer retrieval and ranking unit 206 and an answer assembler 208.

Question parser 204 analyzes the question to identify one or more properties associated with the question. Such properties may include, but are not limited to, question type, answer type expected by the user, key words, search focus of key words, and so forth. In addition, question parser 204 may convert the input question into a database query statement (e.g., in SQL) based on the identified properties by using a predetermined template. The query statement may then be sent to the query language processor 210 in the DBMS 126 to access data in the database 129.

Answer retrieval and ranking unit 206 performs or invokes a search function to retrieve one or more candidate answers to the input question. The search function may be, for example, a full text search function provided by the DBMS 126. Answer retrieval and ranking unit 206 may further generate credit points or scores for each candidate answer based on pre-defined evaluation rules. The credit points or scores may then be used to rank and/or order the candidate answers. Answer assembler 208 may serve to identify the most suitable answer from the candidate answers, extract the relevant answer paragraph from the whole text content, and/or construct the answer text. These and other exemplary features will be described in more detail in the following paragraphs.

QA framework 122 is communicatively coupled to the DBMS 126, which includes an index server 127 and preprocessor server 128. Index server 127 generally includes the actual data and the engines for processing the data. It may also coordinate and use other servers. Index server 127 may include a query language processor 210 and a search module 212. Search module 212 may further include a data store optimizer and execution controller 214, data store operators 216 and a text search engine 220.

To search for data stored in the database 129, a query statement (e.g., SQL) or a full text search may be invoked. If a query statement is received from the question parser 204, the query language processor 210 checks the syntax and semantics of the query statement and generates the logical execution plan. Data store optimizer and execution controller 214 receives the logical execution plan from the query language processor 210 as input and generates the optimized physical execution plan. Data store optimizer and execution controller 214 then executes the optimized physical execution plan by invoking data store operators 216 to access in-memory data 218 stored in database 129.

In some implementations, to enhance the performance of the search, in-memory computing may be leveraged by the DBMS 126. Data collector 202 may download original documents from the knowledge databases (205*a*-205*n*) and store them as in-memory data 218 in the database 129. The in-memory data 218 may be column-based, which can be more efficient than traditional row storage databases. Alternatively, row-based in-memory data 218 is also useful.

Text search engine 220 provides full-text (or document) indexing and search capabilities to allow full-text queries to be run. Full-text queries may include simple words and phrases or multiple forms of a word or phrase. In one implementation, text search engine 220 accelerates query execution by building one or more full text indexes 224 to facilitate location of records. Document analyzer 228 in the preprocessor server 128 may segment sentences or paragraphs in the original documents from the knowledge databases (205*a* to 205*n*) into separate words for the text search engine 220 to build the full text indexes 224. In the case of certain languages based on ideographic characters (e.g., Chinese, Japanese, Korean, etc.) there are no spaces between words. For example, in Chinese, the sentence "他的名字叫姚明" (English translation: His name is Yao Ming), there are no spaces between the words "他的" (His), "名字" (Name), "叫" (is), "姚明" (Yao Ming). Document analyzer 228 may provide a mechanism to recognize such words.

In response to a full-text query, the text search engine 220 may perform a full-text search against text data 222 in full-text indexes 224 to return search results 226. The search may include an exact search for words and phrases, a fuzzy search that tolerates typing errors, and a linguistic search that finds variations of words based on linguistic rules of a particular language (e.g., English). Search results 226 may include any document returned by the search that contains at least one match (also known as a hit). A match occurs when a target document contains all the terms specified in the full-text query, and meets other search conditions, such as the minimum match distance (or similarity measure) between the terms.

Figure 3:
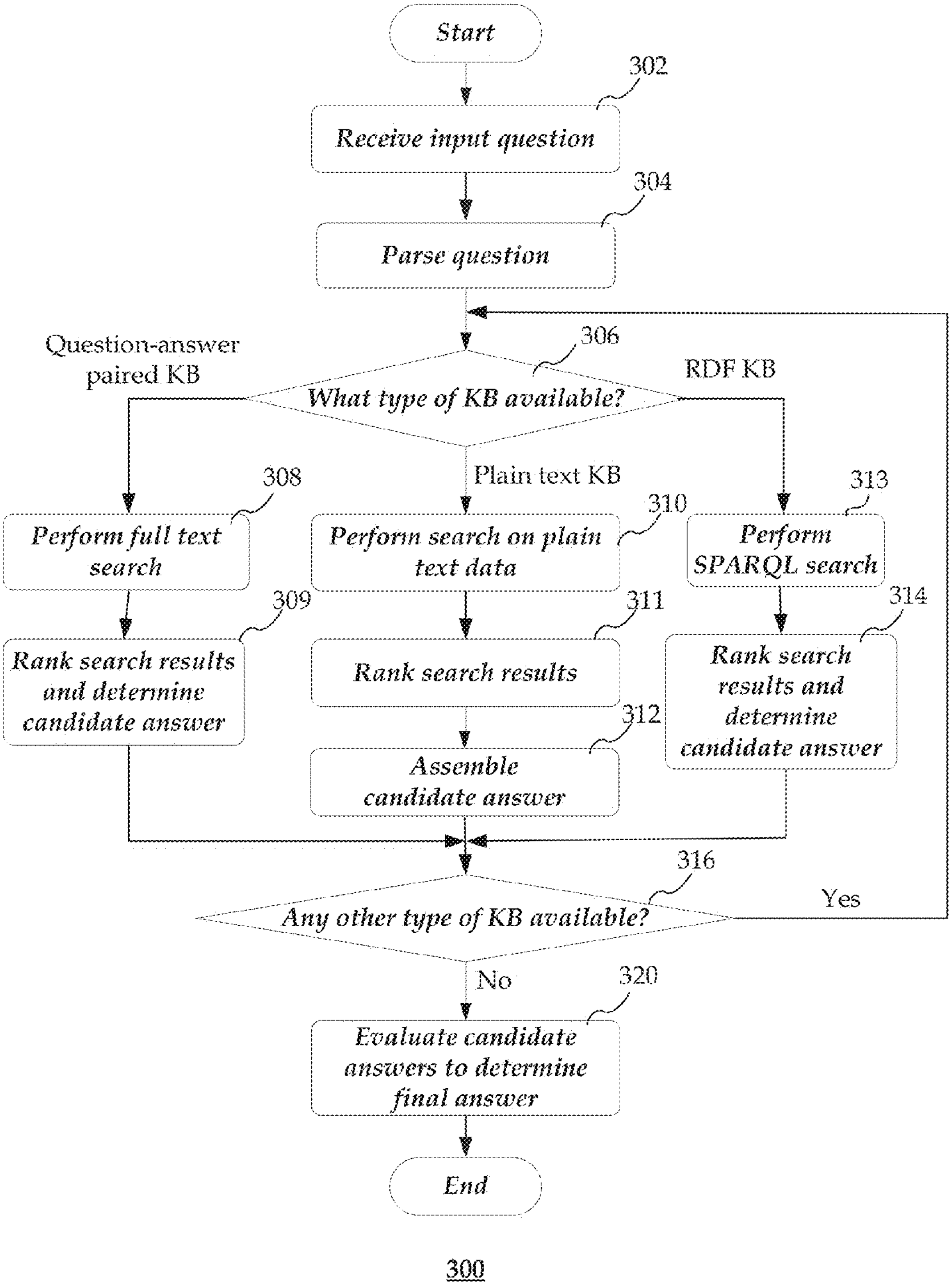
FIG. 3 shows an exemplary question-answering method.

FIG. 3 shows an exemplary QA method 300. The method 300 may be implemented by the system 100 and/or architecture 200, as previously described with reference to FIGS. 1 and 2. It should be noted that in the following discussion, reference will be made, using like numerals, to the features described in FIGS. 1 and 2.

At 302, the QA processor 203 receives an input question. The type of question may include, but is not limited to, a fact, list, definition, How, Why, or hypothetical question. The question may also be closed domain (i.e. under a specific domain) or open domain (i.e. about nearly anything). In addition, the question may be multidimensional. For example, the question "What does SAP stand for?" may be interpreted as a factual question. Alternatively, it may also be interpreted as an abbreviation question.

At 304, the question parser 204 processes the input question to identify properties associated with the question before passing the query to the DBMS 126. In one implementation, the question parser 204 includes or invokes functions from a natural language processing (NLP) library for parsing the natural-language input question. NLP may also be used to parse document content from the knowledge databases (205*a*-205*n*) and extract more detailed semantic and linguistic information.

The input question or document content may be parsed into a set of linguistic distinctions, including, but are not limited to, distinctions as parts-of-speech (POS), sentences, named entities, text tokens, document categories, word chunks, sentence structures, word dependencies, and so forth. For instance, part-of-speech (POS) tagging is a major NLP function that determines if a word in a sentence is a preposition, a noun or any other parts of a speech. Tokenization generally refers to the segmentation of a sentence into "tokens" (e.g., words, punctuation marks, numbers, etc.). Text chunking generally refers to dividing text into syntactically correlated groups of words, such as noun groups, verb groups, and so forth. Such "chunks" of text typically do not specify the internal structure or their role in the original sentence. Named entities generally refer to atomic elements with predefined categories, such as the names of persons, organizations, locations, expressions of times, quantities, monetary values, percentages, etc.

The question parser 204 may use the extracted NLP distinctions to derive higher-level properties associated with the input question. Such properties may include, but are not limited to, the question class (e.g., "what", "which", "when", "where", "who", "why", etc.), question sub-class, expected answer type (e.g., about location, person, date, money, etc.), focus, keyword, etc. The question properties may be used to identify the input question's keywords for performing a full text search and finding the most related paragraph.

More particularly, the question parser 204 may derive the question class by using pre-defined templates that describe a certain question class based on the NLP distinctions. For example, a WHAT question may begin with "WHAT" or sometimes contains a "WHAT" in the beginning of the question. Accordingly, the template for "WHAT" class may be pre-defined as: token value is "WHAT" && group type is 'NP' && token type is "WP", where NP represents "proper noun" and WP represents "wh-pronoun". To identify the question class, a multiple-tier loop (e.g., two-tier loop) may be implemented to parse the input sentence. For example, the question parser 204 may first scan the sentence to identify one or more chunk groups. If a question class cannot be identified based on chunk groups, the question parser 204 may further scan the sentence to identify one or more tokens. If the tokens match a certain pre-defined template, the corresponding class is determined accordingly and saved.

For purposes of illustration, assume that the input question is: "What is Microsoft Office?". A chunk group identifier may mark the question as follows: "What|is|Microsoft Office?". In other words, "What", "is" and "Microsoft Office" are identified as chunk groups with corresponding types [WP], [VBZ]

and [NP] and its two children are both [NNP]. If these chunk group types are associated with a pre-defined question class, then the question class is identified accordingly. For example, the question class may be identified as "What" class, which is defined by the question word "What", its token type is [WP], and the question's target group type is [NP]. If the chunk groups do not match any pre-defined template, the question may be tokenized as [WP] [VBZ] [NNP] [NNP], where [VBZ] represents a verb, 3rd person singular present and [NNP] represents a Proper noun, singular.

Once the question class is determined, the name entity list may be checked to see if any name entity matches the first [NN] token type, where NN represents a noun, singular or mass. If a match is found, the matching name entity from the list is directly selected as the focus. If no match is found, a code level check may be performed to determine the sub-class. More particularly, one or more pre-defined keywords may be used to determine the sub-class. For example, the classes CAPITAL, CITY, COUNTRY, etc. belong to a sub-class LOCATION. Therefore, in the question "What city is the largest one in China?", the pre-defined keyword "city" may be used to determine the sub-class "location".

Another property that may be identified based on the input question is the expected answer type. Answer type generally refers to the type of answer expected by the user or application in response to the input question. In some implementations, the input question class and/or sub-class is mapped to the corresponding answer type in pre-defined tables.

FIG. 4 shows an exemplary pre-defined table 400 that maps classes and sub-classes to corresponding answer types. For example, if the question sub-class is WHAT-WHO, then the answer type may be either PERSON or ORGANIZATION. To determine the answer type, the question parser 204 may use a training data set containing all related information, description and definition of a certain category (e.g., PERSON, ORGANIZATION, LOCATION, etc.) to train a classifier. The training set may include known pairs of question and answer types. The classifier then identifies the answer type based on the first noun phase in the input question after the question class word (e.g., WHAT or WHICH).

For instance, according to a previous rule, the question parser 204 may only know that the questions "What company is the largest in the world?" & "What entrepreneur is the richest in the world?" are all WHAT-WHO questions. The first noun (e.g., "company" and "entrepreneur") after the question word "what" may be used to identify the answer type. Since it is not easy to manually create a rule to cover all cases, an existing training data set may be used as a reference for further determination of the question type.

Yet another property that may be identified based on the input question is the "focus". "Focus" generally refers to a sequence of words that defines what the input question is looking for. For example, in the question "What is the capital of China?", the question parser 204 understands that the question is asking about a LOCATION. However, the question class LOCATION may be too broad, and it may be helpful to narrow down the search to focus on CAPITAL. This means that the answer should be the name of a capital (or city name). The question parser 204 may identify the focus by extracting, from the input question, the first noun after the question class word (e.g., CAPITAL).

Yet another property that may be identified based on the input question is "keyword". An input question may include one or more keywords, which provide the context of the input question and may significantly impact the search results. Keywords may include the focus, although it is not necessarily so in all cases. It may be important to identify the keywords of an input question so that a search may be performed to find the paragraph related to the question. To identify the keywords, the following ordered set of heuristics may be used:

Heuristic 1: All non-stop words of the quotation are keywords;

Heuristic 2: All name entities are keywords;

Heuristic 3: All complex nominals with their adjective modifiers (if has) are keywords;

Heuristic 4: All nouns with their adjective modifiers (if has) are keywords;

Heuristic 5: All verbs are keywords; and

Heuristic 6: Focus is the keyword.

During runtime, the question parser 204 processes each heuristic to extract one or more keywords in accordance with the heuristic order shown. For example, Heuristic 1 may be processed before Heuristic 2, Heuristic 2 processed before Heuristic 3, and so forth. It should be appreciated that other types of heuristics or any other heuristic order may also be applied. In one implementation, the question parser 204 considers only keywords extracted based on the first 4 heuristics; keywords extracted based on the last 2 heuristics may be considered only if more keywords are needed to identify the answer. Alternatively, if an answer cannot be found using any of the extracted keywords, keywords may be dropped in a reversed order in which they have been entered in next several iterations of search so as to broaden the search criteria.

Returning to FIG. 3, at 306, the QA processor 203 identifies the type of knowledge database (KB) available for providing data to the QA framework 122. As discussed previously, the KB may be a question-answer paired KB, a plain text KB, an RDF KB and/or any other type of KB. The data from the different types of KB may be downloaded and stored in the database 129, or retrieved directly from the KB using, for instance, a crawler application in the data collector 202. The type of KB available may be stored in a configuration file. Different search strategies may be implemented for different types of data from the different types of knowledge databases. It should be appreciated that more than one type of knowledge database may be available. By supporting different types of knowledge databases, the present technology is able to provide a high answer finding rate using an expanded collection of knowledge databases.

In one implementation, at 306, the QA processor 203 determines that a question-answer paired KB is available. At 308, the answer retrieval and ranking unit 206 invokes a full text search by the DBMS 126 to generate search results 226. FIG. **5*a* shows a table 502 containing exemplary question-answer paired data from a question-answer paired KB. The table 502 may be downloaded from the question-answer paired KB and stored in, for example, the database 129. As shown, each row of the table 502 stores a pair of question (or TITLE) and answer (or CONTENT). To facilitate the search, two full text indexes 224** may be generated based on the columns "TITLE" and "CONTENT", which represent question and answer contents.

The answer retrieval and ranking unit 206 may invoke the full text search of the question-answer paired data by generating a query statement (e.g., SQL) based on one or more question properties (e.g., focus, keywords, etc.), and sending the query statement to the query language processor 210 of the DBMS 126 for processing and execution. The full text search may be performed based on the full text indexes 224, rather than the original table.

For example, an exemplary SQL statement may be as follows:

```
SELECT *, SCORE ( ) as RANK from "QUESTIONS" where
CONTAINS ((TITLE, CONTENT), 'why is the ocean blue', FUZZY
(0.8)) order by RANK DESC;
```

where the expression "CONTAINS( )" invokes the full text search function by the text search engine 220 and the expression "FUZZY( )" indicates the fault tolerance ratio. The fault tolerance ratio may be initially set to 0.8, and then adjusted, if required, to improve the search results. The expression SCORE ( ) indicates the desired minimum match score for the fault tolerant search algorithm.

FIG. 5*b* shows a table 512 containing exemplary full text search results. As shown, a set of questions (TITLE) related to the input question and corresponding answers (CONTENT), language (LANG) and sources of the answers (URL) are returned in the table 512. Other types of information may also be provided in the search results.

As discussed previously, the full text search may provide fault tolerance for user input of the question text. This allows the search to accommodate typographical errors and improve search quality by returning more possible search results. In one implementation, an n-gram matching algorithm is used to provide a fuzzy full-text search. FIG. 6 shows an exemplary n-gram model 602. For each string 604, a set of n-grams 606 may be generated. The fuzzy search may be performed by matching the n-grams of the input string with the n-grams of the data string. For example, assuming that the input string is "hans" and the data strings are "gans" and "haas", the fuzzy match score 608 between "hans" and "gans" is 63% (i.e. 5 out of 7 n-grams match), while the fuzzy match score 608 between "hans" and "haas" is also 63%. If the desired minimum match score is less than 63%, the data strings "hans" and "haas" are returned as search results.

Returning to FIG. 3, at 309, the answer retrieval and ranking unit 206 ranks the search results 226 to determine the most relevant candidate answer. The search results 226 may include a set of candidate question-answer pairs related to the input question. The answer retrieval and ranking unit 206 may rank the search results 226 by assigning a score to each candidate question-answer pair. The most related question is identified based on the scores and the corresponding answer is returned as the candidate answer.

In some implementation, a fuzzy score is assigned to each candidate question-answer pair. The fuzzy score may be computed by determining a measure of similarity between the input question and candidate questions. The measure of similarity is determined by comparing the words in the input question and each candidate question. For example, if the input question is: "Who is Bill Gates?", and the candidate question contains the exact same words, the fuzzy score is 1.0. However, if the candidate question is "Who is Bill Gate's daughter?", the fuzzy score may be computed as follows:

$$\text{SCORE}=\text{Common\_Word\_Count}/(SQRT(\text{Word\_Count\_of\_Input\_Question})*SQRT(\text{Word\_Count\_of\_Candidate\_Question}))=4/(SQRT(4)*SQRT(5))=0.894. \quad (1)$$

At 306, the QA processor 203 may determine that a plain text KB is available. At 310, a search is performed on plain text data from the plain text KB. The question parser 204 may construct a query statement based on a mining set of search terms (e.g., keywords, focus, etc.) associated with the input question. The query statement is then sent to the query language processor 210 for processing, and to invoke the search to generate search results. Candidate plain text paragraphs may be returned as search results.

The answer retrieval and ranking unit 206 may iteratively refine the search by broadening or narrowing the search criteria until the number of search results meets a pre-specified threshold. The search may be broadened by expanding the mining set of search terms (i.e. conflation). A synonyms dictionary (e.g., WordNet) may be used to add synonyms of extracted question properties (e.g., focus, keywords, etc.) to the mining set.

For example, the input question may be as follows: "Who is the principal of Thomas Jefferson high school?". The keywords may be "principal", "Thomas", "Jefferson", "high school" and the focus may be "principal". The answer retrieval and ranking unit 206 may use expanded keywords to perform the search. Expanded keywords are obtained by, for example, mapping original keywords (or stems of keywords) to synonyms, as previously described. For example, if the keywords are "high school", the synonym "senior" may be added to the mining set, which may include the following:

(high&school)|(senior&high&school)|(senior&high)|high|highschool

In the above-mentioned mining set of search terms, the word "high" may be considered too common in the English language, and may represent a totally different meaning than the original keywords "high school" by itself or combined in other phrases. Such common words may be removed from the mining set to yield more accurate search results. To identify common words, the answer retrieval and ranking unit 206 may perform a look-up on a pre-defined list of common words.

Another method of expanding the mining set of search terms to broaden the query is via stemming. "Stemming" generally refers to a process for reducing inflected (or sometimes derived) words to their stem, base or root form. For example, a stemmer for English may identify the string "cats" (and possibly "catlike", "catty" etc.) based on the root "cat", and "stemmer", "stemming", "stemmed" based on "stem". Once the stem of a keyword is determined, variations of the stem may be added to the mining set of search terms to broaden the query.

At 311, the answer retrieval and ranking unit 206 ranks the search results 226 to determine the most relevant candidate answer. The search results 226 may include a set of plain text candidate paragraphs. The number of candidate paragraphs may be very large, particularly when the keywords of the input question are common or ordinary words. The answer retrieval and ranking unit 206 may rank the candidate paragraphs by assigning a score to each candidate paragraph. The candidate paragraph most relevant to the input question may be identified based on the scores and returned as the candidate answer.

In one implementation, the score includes a term frequency-inverse document frequency (TF-IDF) score. A TF-IDF score is computed by counting the number of words (or synonyms of the words) that are common to both the candidate paragraph and the input question. For example, if the candidate paragraph shares a same common word with the input question, 2 points may be assigned. If the candidate paragraph shares a same synonym with the input question, 1 point may be assigned. No points may be assigned if there are no common words or synonyms. The final score for the candidate paragraph may be obtained by the following:

$$\text{Final Score}=\text{Total Score}/(\text{Number of different words}) \quad (2)$$

It should be noted that other types of scoring techniques may also be implemented.

In some cases, the text of the original candidate paragraph may be too long and therefore not suitable as a candidate answer. Before computing the score and ranking such candidate paragraph, the answer retrieval and ranking unit 206 may segment the long text of the candidate paragraph into smaller segments of text. In one implementation, hierarchy information in metadata provided by the knowledge database is used to split the search result text. For example, original web pages from Wikipedia contain hierarchy information of each paragraph in the metadata that may be used to segment the text. Other information, such as font size and indentation format, may also be used to derive the hierarchy and segment the text.

In some implementations, particularly where there is no information available for segmentation, a tokenization method is used to segment the text. The original text may be tokenized by removing stop words and using the remaining words as basic units. "Stop words" generally refer to words that are filtered out prior to, or after, processing the natural language text. For example, "the", "is", "are", etc. are very common words that may be considered stop words.

Figure 7:
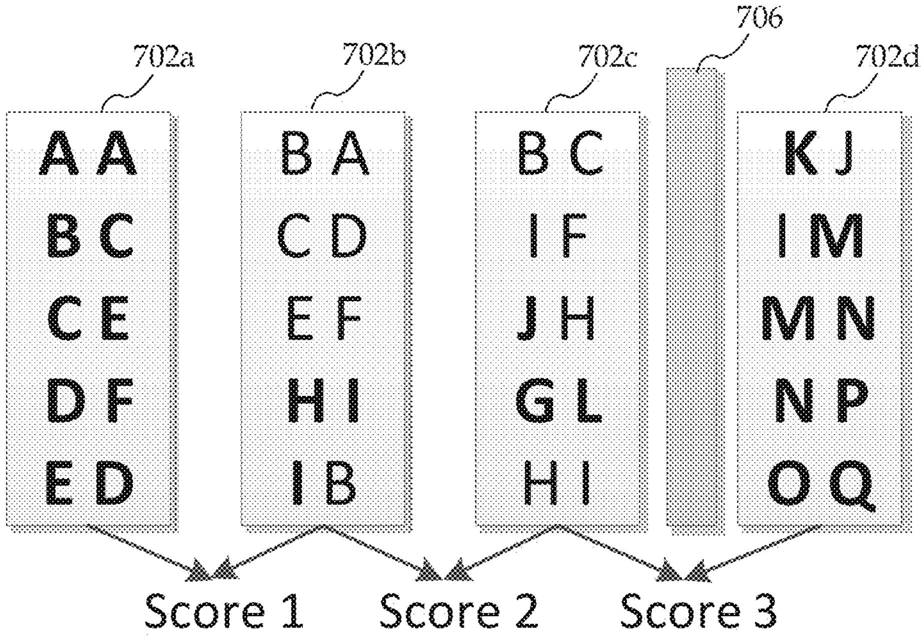
FIG. 7 shows multiple basic units derived from a long paragraph after tokenization.

FIG. 7 shows multiple basic units 702*a-d* derived from a long paragraph after tokenization. Each point between consecutive basic units (702*a*, 702*b*, 702*c* or 702*d*) is a potential break point of the long paragraph. To determine where the break point is, a topic shift is detected by comparing similarity scores between consecutive basic units. The similarity score measures the number of common words and synonyms shared between the basic units. A lower similarity indicates a possible topic shift. For example, referring to FIG. 7, a first similarity score (Score 1) may be computed between first basic unit 702*a* and second basic unit 702*b*; a second similarity score (Score 2) may be computed between second basic unit 702*b* and third basic unit 702*c*; a third similarity score (Score 3) may be computed between third basic unit 702*c* and fourth basic unit 702*d*. Since the third and fourth basic units (702*c-d*) are the most dissimilar, Score 3 may be the lowest, thereby indicating a possible topic shift. The long paragraph may therefore be separated into 2 segments at the break point 706 between the third and fourth basic units (702*c-d*).

Referring back to FIG. 3, at 312, the answer assembler 208 constructs the candidate answer based on the most relevant candidate paragraph. There are many ways of delivering the same answer. In one implementation, the answer assembler 208 determines the template of the input question, and maps the question template to an answer template. The candidate answer may then be assembled in accordance with the answer template.

FIG. 8 shows an exemplary pre-defined look-up table 800 containing question and answer templates for the "who" question. Referring to the table 800, for example, the input question of "Who is the CEO of Apple?" may be associated with the question template "Who be <role> of <entity>". By using the look-up table 800, the answer assembler 208 maps the question template to the answer template "<person>". The answer may then be assembled in accordance with the answer template by replacing the tag <person> with the answer "Tim Cook". Similar look-up tables may be pre-defined for different question classes and sub-classes, such as "what", "who", "how", "where", "when", "which", "why", "whom", and so forth.

In some cases, the level of detail in the most relevant paragraph may be too high, and needs to be further reduced to yield higher precision. For instance, the question may be as follows:

"When was Wolfgang Amadeus Mozart born?"

The answer retrieval and ranking unit 206 may return the following paragraph:

"Wolfgang Amadeus Mozart was born on 27 Jan. 1756 to Leopold Mozart (1719-1787) and Anna Maria, née Pertl (1720-1778), at 9 Getreidegasse in Salzburg."

To achieve higher precision, the answer assembler 208 may extract "27 Jan. 1756" as the candidate answer.

It should be appreciated that not all paragraphs may be refined or shortened. For example, a factoid question such as "Why is the sky blue?" may yield the following paragraph: "The sky is blue because of the way the Earth's atmosphere scatters light from the sun." It is not necessary to shorten such paragraph. The entire paragraph may be returned as the candidate answer.

To extract the candidate answer from the paragraph, the answer assembler 208 may employ a machine learning framework. For example, the input question may be as follows:

"Which year was Wolfgang Amadeus Mozart born?"

The original text of the most relevant pargaraphs returned by the answer retrieval and ranking unit 206 may be as follows:

Wolfgangus Theophilus Mozart (1756-1791), was a prolific

Wolfgang Amadeus Mozart was born in Salzburg in 1756

Wolfgangus Theophilus Mozart (*1756 in Salzburg

Wolfgang Amadeus Mozart (b. Salzburg, 1756; d. 1791)

To extract the answer "1756" from the paragraphs, a training set including known question-answer pairs may be used to train the machine learning framework.

In some implementations, the training set is generated by first collecting a set of known question and answer pairs. For example, the question "When was Bill Gates born?" may be paired with the known answer "Oct. 28, 1955." The set of known question and answer pairs may then be analyzed to extract the key words (e.g., "Bill Gates", "born", etc.). The internet (e.g., Google, Bing, Yahoo, etc.) or other knowledge databases may be searched via, for example, a search engine, to collect documents associated with the key words. Unnecessary sentences in the documents that do not include the keywords may be removed. In addition, the documents may be tokenized for further analysis. The longest matching strings may be retrieved from the original documents to form the training set.

For example, the following training information may be collected: "Entrepreneur Bill Gates was born on Oct. 28, 1955, in Seattle, Wash."; "Bill Gates born on 28 Oct. 1955 Seattle, Wash. is the founder of Microsoft"; and so forth. Based on the collected information, the following answer templates may be identified: (i)<NAME> was born on <Answer>; and (ii)<NAME> born on <Answer>.

After the training set is generated, the candidate answer may be extracted from input paragraphs. For purposes of illustration, assume that the input question is: "When was Wolfgang Amadeus Mozart born?". The original text of a paragraph returned by the answer retrieval and ranking unit 206 may be as follows: "Wolfgang Amadeus Mozart was born on 1756". Based on the training set, the input question type may correspond to the answer template: <NAME> was born on <Answer>. Since the paragraph matches the answer template, the answer "1756" may be extracted as the candidate answer.

The above-mentioned answer assembly mechanism is particularly suitable for factoid and certain types of questions. However, it should be appreciated that not all types of questions may be processed by the above-mentioned answer assembly mechanism. A degradation mechanism may be required for certain question types. For instance, if answer extraction is difficult, the answer assembler 208 may search the paragraph only by the keywords and return only the search result as the candidate answer. Although answer accuracy may not be high, at least basic related information is provided to the end user.

Referring back to FIG. 3, at 306, the QA processor 203 may determine that an RDF KB is available. At 313, the answer retrieval and ranking unit 206 invokes an RDF search by the DBMS 126. The RDF search may be invoked by submitting a query constructed by the user using SPARQL Protocol and RDF Query Language (SPARQL). SPARQL is standardized by the RDF Data Access Working Group of the W3C and is an official W3C recommendation. SPARQL allows for a query to include triple patterns, conjunctions, disjunctions, patterns, etc. SPARQL also allows for federated queries where the query is distributed to multiple locations and results from the distributed query are aggregated. SPARQL queries are translated to SQL queries before processing by query language processor 210.

FIG. 9 shows exemplary RDF format data stored in an RDF knowledge database. As shown, facts are stored in triples as "Subject", "Predicate" and "Object". The keywords of the input question are used to query the database 129 to find the most related paragraph. In one example, the input question may be as follows:

"What is the capital of India?"

Upon parsing the input question, the keywords of the input question may be "capital" and "India". Predefined patterns may be stored in the DBMS 126 in, for example, column tables that define corresponding question types, keywords, predicates, etc. By using a predefined pattern, the answer retrieval and ranking unit 206 translates the input question directly into an SQL query to access the RDF knowledge database, as follows:

```
Select object from Yago facts where subject = '<India>' and
predicate = '<hasCapital>'
```

In another example, the input question may be as follows:

"When was Bill Clinton's daughter born?"

The answer retrieval and ranking unit 206 may translate the input question into an SQL query to access the RDF knowledge database to retrieve the birthdate of Bill Clinton's daughter, as follows:

```
select distinct T3.subject, T3.object from Yago facts T1
    inner join Yago facts T2 on T1.object = T2.subject
    inner join Yago facts T3 on T1.object = T3.subject
where T1.subject ='<Bill_Clinton>' and T1.predicate = '<hasChild>'
    and T2.predicate = '<hasGender>' and T2.object = '<female>'
    and T3.predicate = '<wasBornOnDate>'
```

Alternatively, the above-mentioned input question may be translated into a more readable SPARQL query, as follows:

```
Select ?d where {
?s              wasBornOnDate      ?d.
?s              hasGender          female.
Bill_Clinton    hasChild           ?s}
```

To facilitate the query formulation process, a SPARQL-to-SQL mapping engine may be implemented. This allows SPARQL queries to be supported by an SQL-based DBMS. To map keywords to SPARQL triple patterns, relevant Internationalized Resource Identifiers (IRIS) related to each keyword may first be retrieved. An IRI within an RDF graph is a Unicode string that conforms to the syntax defined in RFC 3987 [IRI]. IRIs generalize uniform resource identifiers (URIs) or uniform resource locators (URLs). Every absolute URI or URL is an IRI.

Next, a pre-configured SPARQL triple pattern template is applied to the query based on the retrieved IRIs. Some SPARQL triple pattern templates may be configured based on observations of YAGO facts (e.g., predicates like <hasGender>, <hasCapital>, etc.). For keywords that have no pre-configured patterns, the DBMS performs a full text fuzzy search on the subject and object columns to retrieve an approximately matching IRI in the YAGO facts table. The matching IRI is then used in the SPARQL query.

As discussed previously, to enable a full text search on subject and object columns, a full text search index may first be created on the subject and object columns. The answer retrieval and ranking unit 206 may generate the following SQL statement to perform the fuzzy search:

```
select *, score( ) as rank from "yaofacts" where contains((subject,
object),
'XXX_XXX',FUZZY(0.8)) order by rank desc;
```

If no answer is retrieved with the selected SPARQL query, the query may be repeated with a reduced fuzzy co-efficient and/or reduced number of keywords until some answers are retrieved.

After the search results are obtained, the number of search results (i.e. count) is compared to a pre-specified threshold. If the search count is less than the pre-specified threshold, the search criteria may be broadened by, for example, removing search terms and/or changing logical operators between the search terms from AND to OR. For example, the original search criteria may be as follows: principal&Thomas&Jefferson&(high school). The search criteria may be expanded to the following: (principal|(school principal)|(head teacher))&Thomas&Jefferson&((high school)|(senior high school)).

Conversely, if the search count is higher than the pre-specified threshold, the search criteria may be narrowed by, for example, adding search terms and/or changing logical operators between the search terms from OR to AND. Accordingly, a suitable number of search results (e.g., text paragraphs) may be returned.

Referring back to FIG. 3, at 314, the answer retrieval and ranking unit 206 ranks the RDF search results to determine the most relevant candidate answer. The answer retrieval and ranking unit 206 may rank the RDF search results by assigning a fuzzy score or any other suitable score to each RDF search result. The most related question may be identified based on the score and the corresponding candidate answer is returned as the candidate answer.

At 316, the QA processor 203 determines whether there are any other types of KB available. If so, step 306 is repeated to determine what type KB is available. It should be appreciated that steps 308, 310 and/or 313 may also be performed in parallel to obtain the search results 226.

At 320, the QA processor 203 evaluates the candidate answers to find the final answer to be returned to the user. Each type of knowledge database (e.g., question-answer paired KB, plain text KB, RDF KB, etc.) may yield zero or one candidate answer. Where there are multiple types of knowledge databases, there may be multiple candidate answers.

Since it is not easy to compare the candidate answers obtained from the different types of knowledge databases, the QA processor 203 may use one or more pre-defined heuristic rules based on the question type to determine the final answer. In some implementations, all the candidate answers are ranked to find the final best one. The ranking may be based on one or more pre-defined heuristic rules. For example, if the candidate answer was retrieved from a question-answer paired KB and its SCORE ( ) is greater than or equal to 80%, the candidate answer will be returned as the final answer. Such candidate answer is deemed the most accurate and thus assigned the highest priority, because question-answer pairs are defined manually. Next, if no candidate answer was retrieved from a question-answer paired KB, the answer assembler 208 determines if the input question is a pure factoid question. If so, the candidate answer retrieved from an RDF KB is returned as the final answer if possible. RDF data are structure data that are naturally suitable for factual description, which is typically used to answer a factoid question. Factoid questions are questions such as "what is", "who is" and etc. Next, if there is no suitable candidate answer retrieved from an RDF KB, the candidate answer retrieved form the plain text KB is returned as the final answer.

In some cases, the QA processor 203 may determine that all the candidate answers are not good enough, or that there is no candidate answer. In such case, the answer assembler 208 may send a text message to the end user, such as "Sorry, I don't know the answer."

The evaluation process may be refined by recording the feedback from the end user in historical question and answering tasks. In such case, the user may rate or input a ranking score for each answer. The QA processor 203 may also allow the end user to correct the answer and manually answer the question. The QA processor 203 may then improve its question-answering capability based on the user feedback.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented question-answering method, comprising:

receiving an input question;

determining multiple types of knowledge databases available for searching, wherein the multiple types of knowledge databases provide data in different formats and include a question-answer paired knowledge database, a plain text knowledge database, a resource description framework (RDF) knowledge database or a combination thereof;

when the question-answer paired knowledge database is available, searching question-answer paired data from the question-answer paired knowledge database to determine a first candidate answer to the input question;

when the plain text knowledge database is available, searching plain text data from the plain text knowledge database to determine a second candidate answer to the input question;

when the resource description framework (RDF) knowledge database is available, searching RDF data from the RDF knowledge database to determine a third candidate answer to the input question; and evaluating the first, second or third candidate answer to generate a final answer to the input question.

2. The method of claim 1 further comprising parsing the input question and identifying one or more properties associated with the input question.

3. The method of claim 2 wherein identifying the one or more properties includes identifying a question class or a question sub-class.

4. The method of claim 2 wherein identifying the one or more properties includes identifying an expected answer type.

5. The method of claim 2 wherein identifying the one or more properties includes identifying a focus.

6. The method of claim 2 wherein identifying the one or more properties includes identifying a keyword.

7. The method of claim 1 wherein searching the question-answer paired data from the question-answer paired knowledge database comprises:

generating a query statement based on one or more properties associated with the input question, wherein the query statement is executable to perform a full text search of the question-answer paired data to generate search results.

8. The method of claim 7 wherein the full text search comprises a fuzzy search based on an n-gram algorithm.

9. The method of claim 7 further comprising ranking the search results to determine at least one of the one or more candidate answers.

10. The method of claim 1 wherein searching the plain text data from the one plain text knowledge database comprises:

generating a query statement based on a mining set of search terms associated with the input question, wherein the query statement is executable to perform a search of the plain text data to generate search results.

11. The method of claim 10 further comprising iteratively refining the search by broadening or narrowing search criteria until a number of the search results meets a pre-specified threshold.

12. The method of claim 10 further comprising constructing, using an answer template, at least one of the one or more candidate answers based on the search results.

13. The method of claim 12 further comprising reducing a level of detail of the candidate answer by using a machine learning framework.

14. The method of claim 1 wherein evaluating the one or more candidate answers to generate a final answer to the input question comprises ranking the one or more candidate answers based on one or more pre-defined heuristic rules.

15. A non-transitory computer-readable medium having stored thereon program code, the program code executable by a computer to:

receive an input question;

identify multiple types of knowledge databases available for searching, wherein the multiple types of knowledge databases provide data in different formats and include a question-answer paired knowledge database, a plain text knowledge database, a resource description framework (RDF) knowledge database or a combination thereof;

when the question-answer paired knowledge database is available, search question-answer paired data from the question-answer paired knowledge database to determine a first candidate answer to the input question;

when the plain text knowledge database is available, search plain text data from the plain text knowledge database to determine a second candidate answer to the input question;

when the resource description framework (RDF) knowledge database is available, search RDF data from the RDF knowledge database to determine a third candidate answer to the input question; and evaluate the first, second or third candidate answer to generate a final answer to the input question.

16. A system comprising:

a non-transitory memory device for storing computer readable program code; and a processor in communication with the memory device, the processor being operative with the computer readable program code to:

receive an input question;

identify multiple types of knowledge databases available for searching, wherein the multiple types of knowledge databases provide data in different formats and include a question-answer paired knowledge database, a plain text knowledge database, a resource description framework (RDF) knowledge database or a combination thereof;

when the question-answer paired knowledge database is available, search question-answer paired data from the question-answer paired knowledge database to determine a first candidate answer to the input question;

when the plain text knowledge database is available, search plain text data from the plain text knowledge database to determine a second candidate answer to the input question;

when the resource description framework (RDF) knowledge database is available, search RDF data from the RDF knowledge database to determine a third candidate answer to the input question; and evaluate the first, second or third candidate answer to generate a final answer to the input question.

* * * * *